(No Model.) 6 Sheets—Sheet 2.

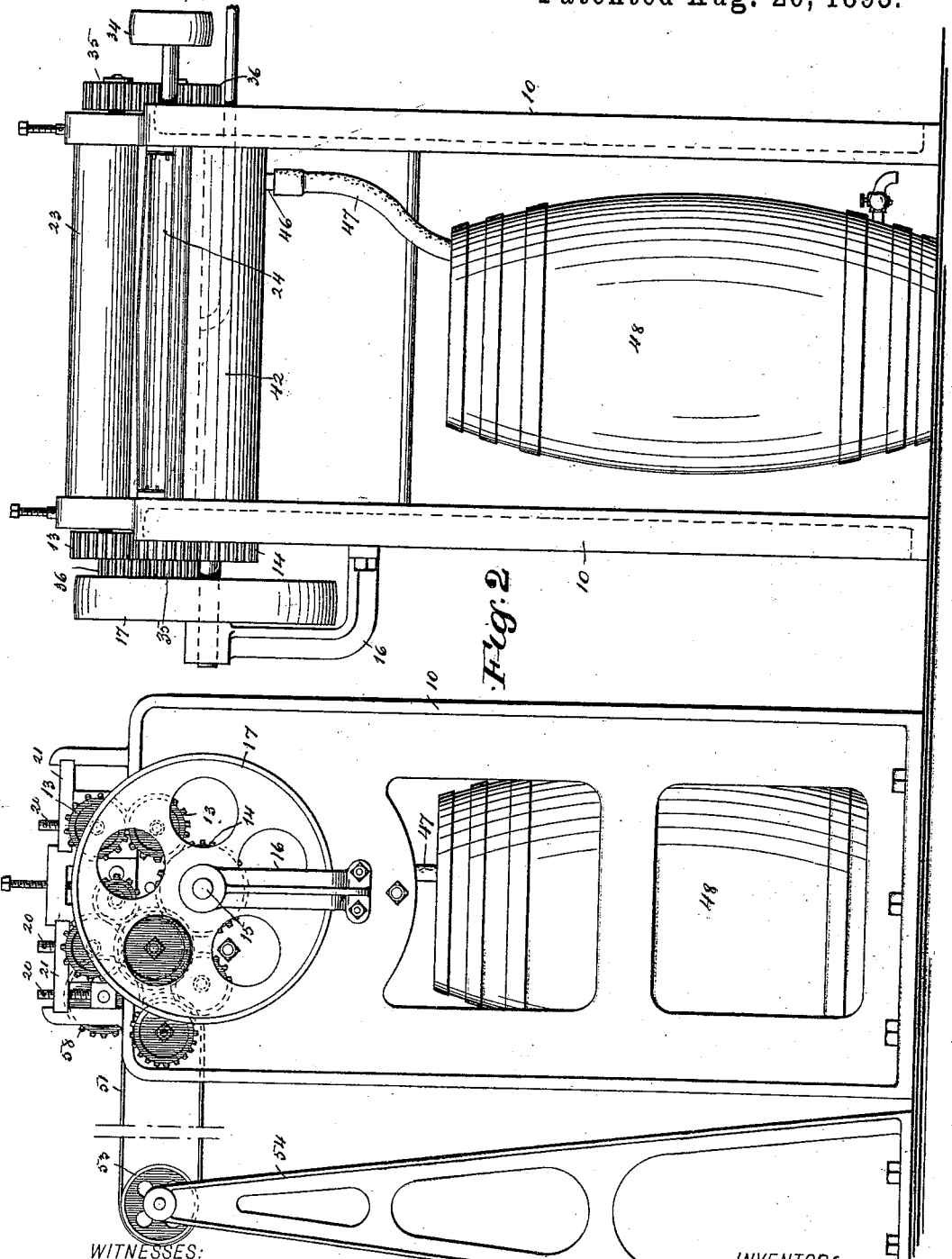

J. H. SANDERS, J. E. CARLIN & H. FITZPATRICK.
CARROTTING MACHINE.

No. 544,693. Patented Aug. 20, 1895.

WITNESSES:
Joshua Bergstrom
W. P. Hutchinson

INVENTORS
J. H. Sanders
J. E. Carlin
BY H. Fitzpatrick
Munn & Co
ATTORNEYS.

(No Model.) 6 Sheets—Sheet 3.
J. H. SANDERS, J. E. CARLIN & H. FITZPATRICK.
CARROTTING MACHINE.

No. 544,693. Patented Aug. 20, 1895.

WITNESSES:
INVENTORS
J. H. Sanders
J. E. Carlin
BY H. Fitzpatrick
Munn & Co.
ATTORNEYS.

(No Model.) 6 Sheets—Sheet 4.
J. H. SANDERS, J. E. CARLIN & H. FITZPATRICK.
CARROTTING MACHINE.
No. 544,693. Patented Aug. 20, 1895.
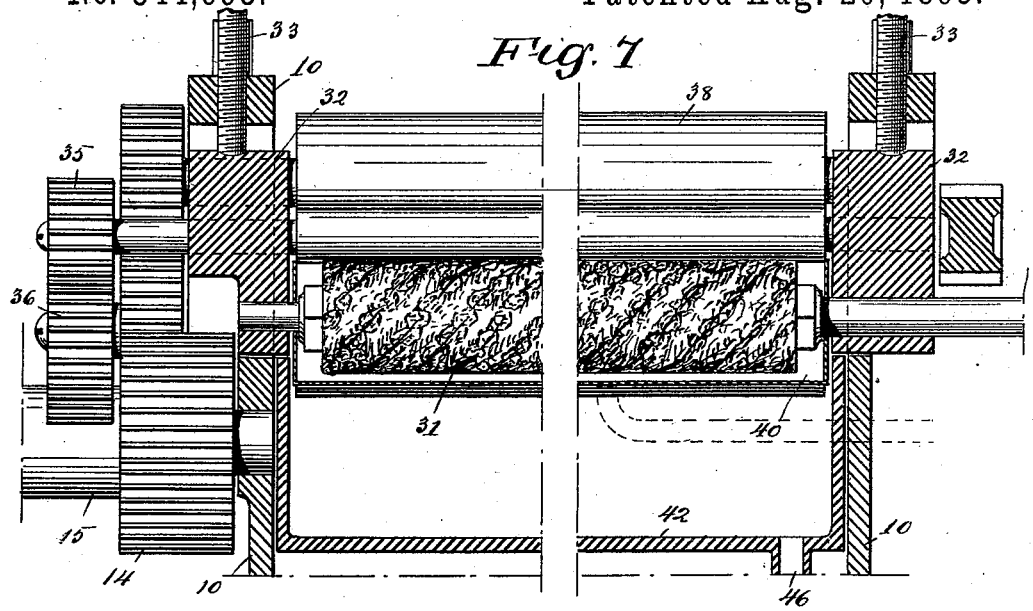
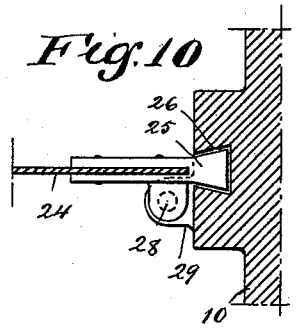
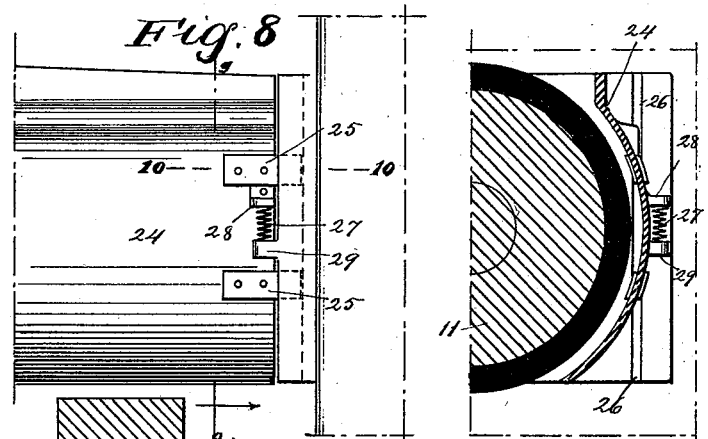
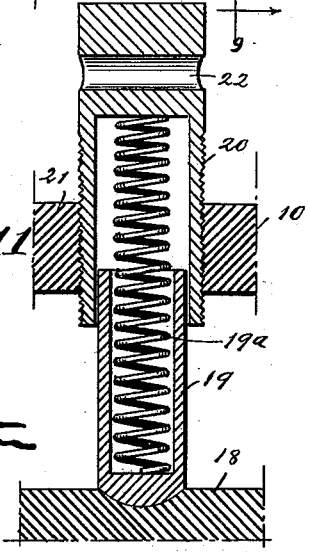
WITNESSES:
John A. Burgstrom
W. B. Hutchinson
INVENTORS
J. H. Sanders
J. E. Carlin
BY H. Fitzpatrick
Munn & Co.
ATTORNEYS.

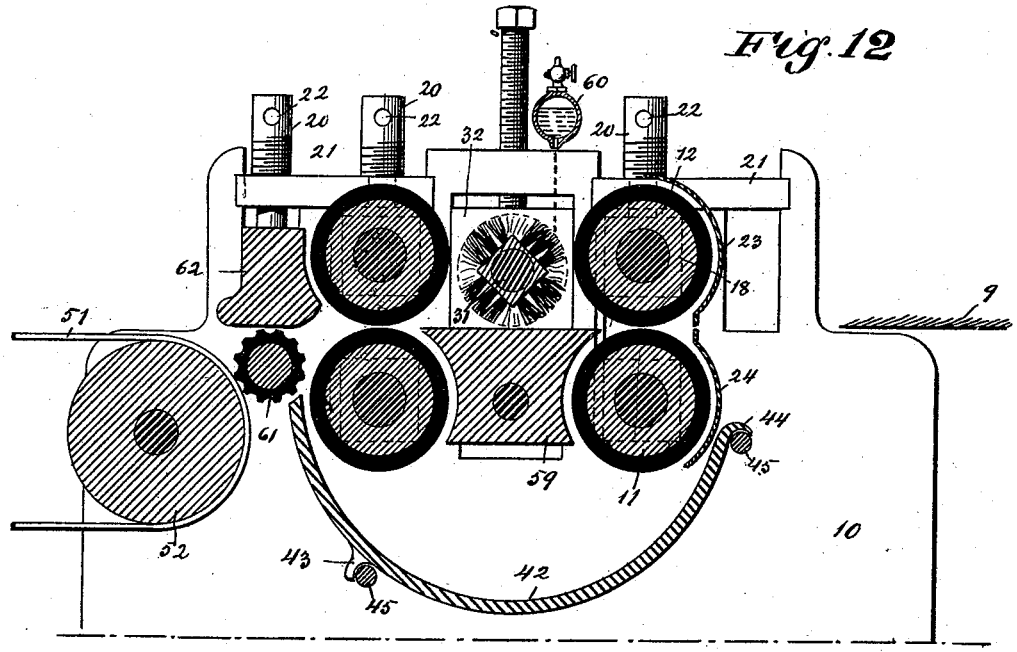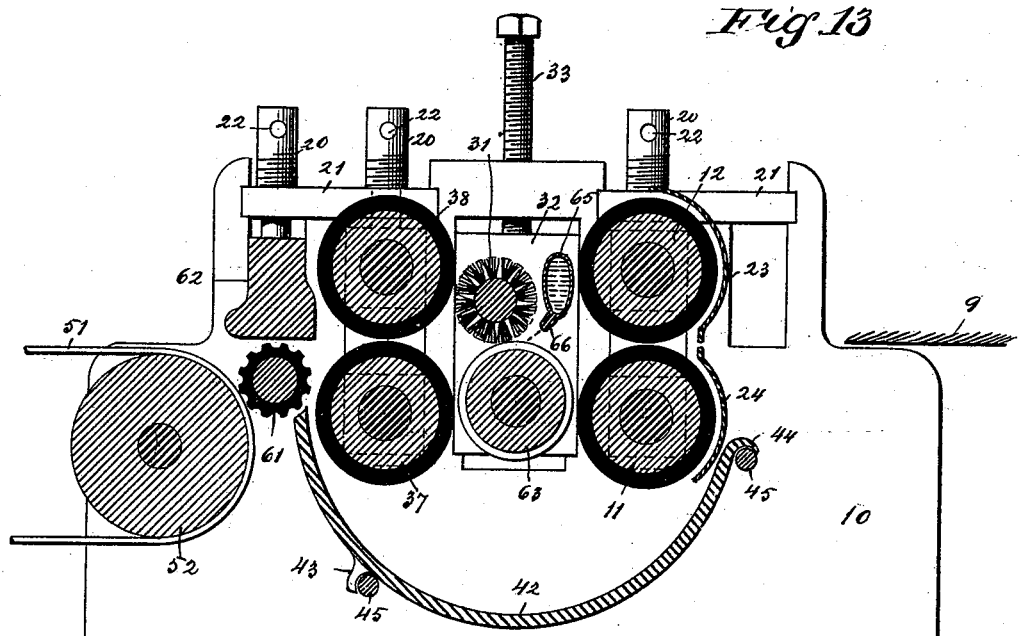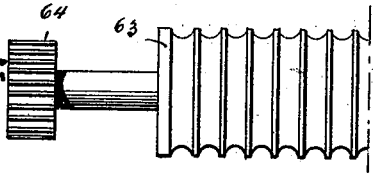

UNITED STATES PATENT OFFICE.

JOHN H. SANDERS, OF NEW YORK, JAMES E. CARLIN, OF BROOKLYN, NEW YORK, AND HUGH FITZPATRICK, OF EASTON, PENNSYLVANIA, ASSIGNORS TO SAID SANDERS AND CARLIN.

CARROTING-MACHINE.

SPECIFICATION forming part of Letters Patent No. 544,693, dated August 20, 1895.

Application filed August 3, 1894. Serial No. 519,424. (No model.)

*To all whom it may concern:*

Be it known that we, JOHN H. SANDERS, of New York city, in the county of New York, JAMES E. CARLIN, of Brooklyn, in the county of Kings, State of New York, and HUGH FITZPATRICK, of Easton, in the county of Northampton and State of Pennsylvania, have invented a new and Improved Carroting-Machine, of which the following is a full, clear, and exact description.

Our invention relates to improvements in machines for carroting fur to adapt it for use in the manufacture of hats.

The object of our invention is to produce a machine which is adapted to carrot fur much more rapidly than it can be carroted by hand; also, to produce a machine which will do a nicer job than is usually done by hand; and, further, to produce a machine which is adapted to apply the acid very evenly and nicely to the fur, is also adapted to save the acid so that it may be reused, and is adapted to polish and wring out the fur and deliver it in a finished condition at the rear end of the machine.

Still another object of our invention is to construct the machine in a very simple, durable, and substantial manner in order that it may work for a long time without getting out of order.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 3:
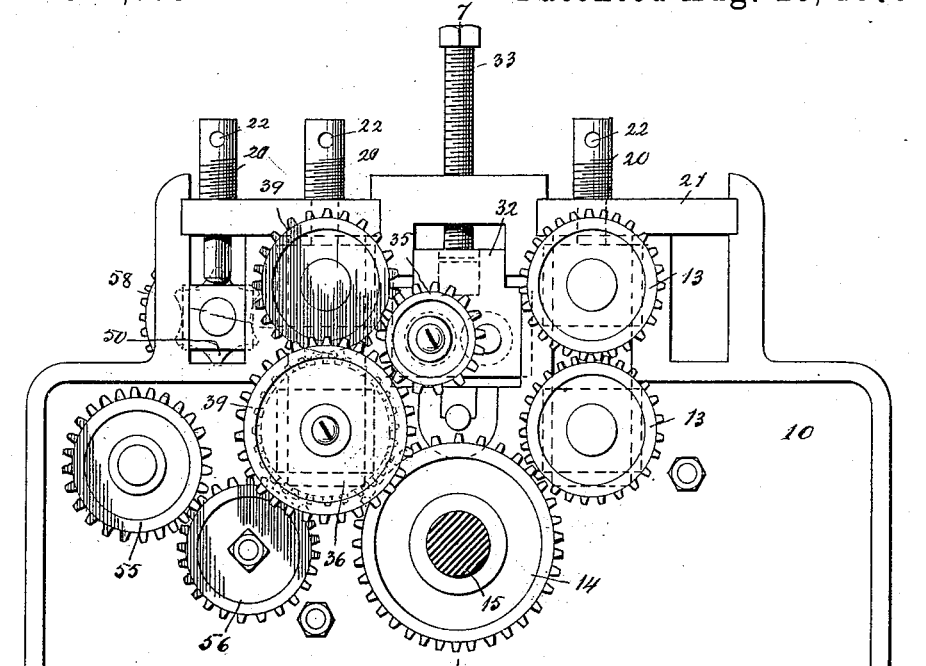
Figure 4:
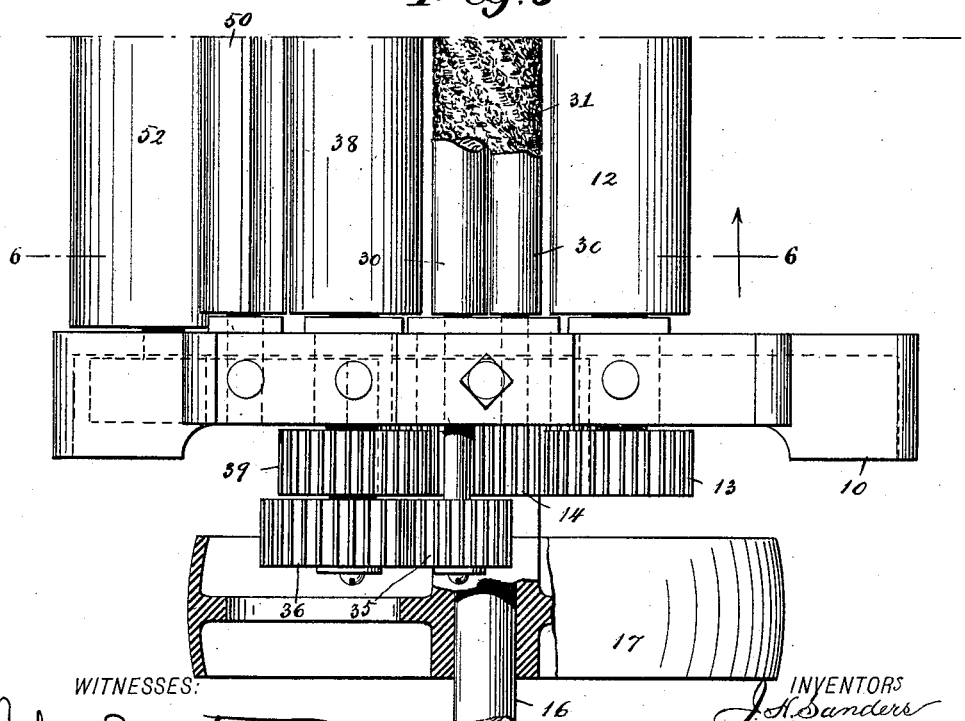
Figure 5:
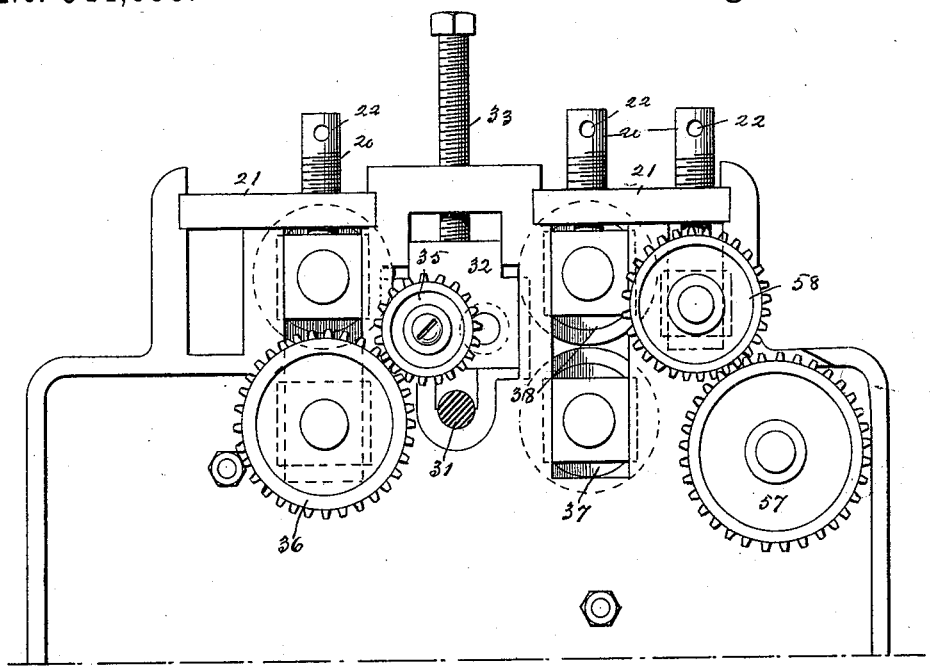
Figure 6:
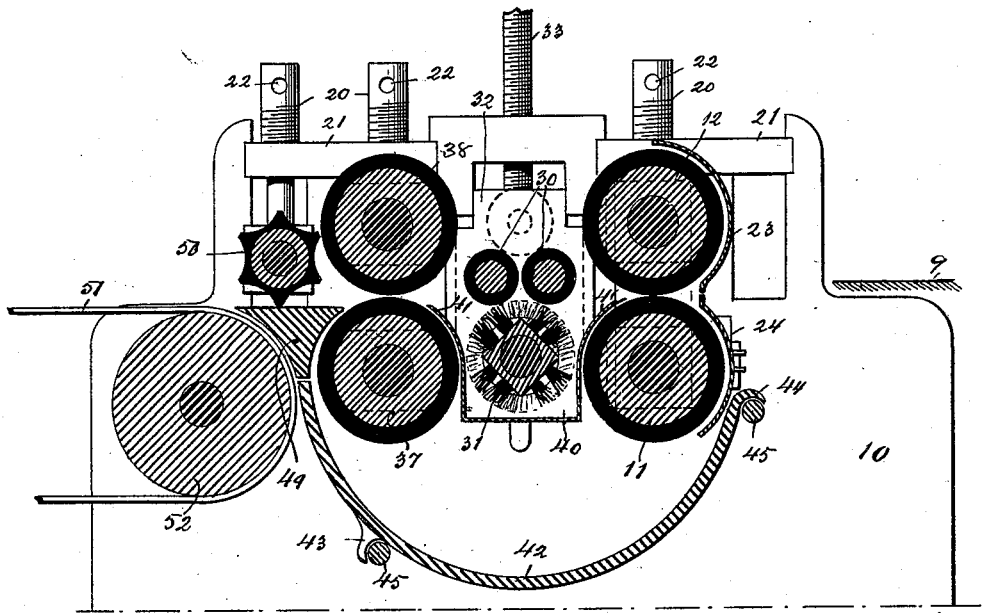
Figure 15:
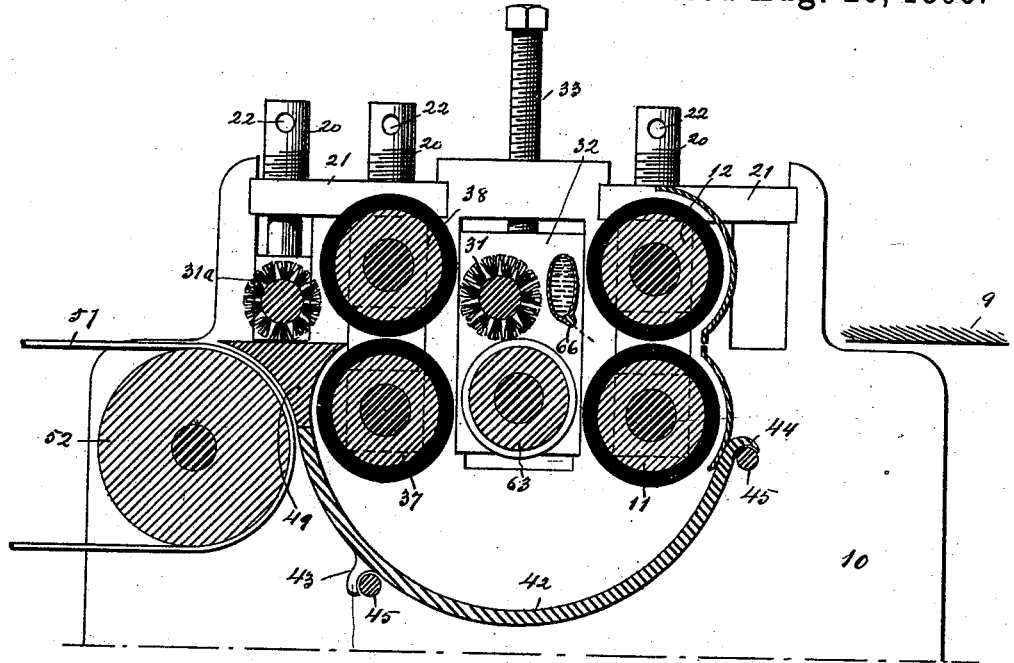
Figure 16:
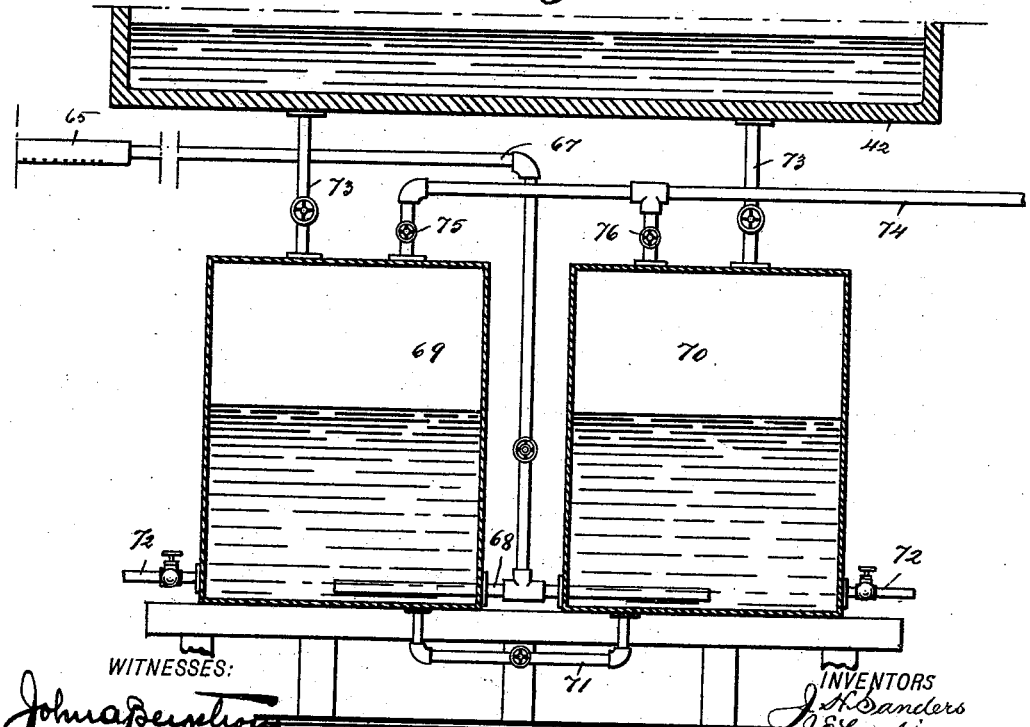

Figure 1 is a broken side elevation of the machine embodying our invention. Fig. 2 is a front elevation of the machine. Fig. 3 is an enlarged detail sectional elevation of one side of the machine, showing the gear mechanism for running the several rollers. Fig. 4 is a broken plan view of the top portion of the machine and the driving mechanism of the roller. Fig. 5 is a sectional elevation of the working parts of the machine, but taken from the side opposite to that shown in Fig. 3. Fig. 6 is a cross-section on the line 6 6 of Fig. 4. Fig. 7 is a broken vertical section on the line 7 7 of Fig. 3. Fig. 8 is an enlarged detail front elevation of one of the adjustable aprons which is arranged in front of the lower feed-roller. Fig. 9 is a cross-section on the line 9 9 of Fig. 8. Fig. 10 is a detail sectional plan on the line 10 10 of Fig. 8. Fig. 11 is an enlarged detail sectional view of the spring and screw mechanism for adjusting the bearings of the several rollers. Fig. 12 is a cross-section similar to Fig. 6, but showing some slight modifications in the machine. Fig. 13 is a similar section showing other modifications and also a jet-pipe for delivering acid to the fur. Fig. 14 is a broken detail view of a roller which may be used in connection with the brush. Fig. 15 is a cross-section similar to the sections above referred to, but showing still other modifications in the machine; and Fig. 16 is a broken detail sectional view of the mechanism for forcing the acid through the jet-pipe and for returning the same to a receiving-tank.

The machine is provided with a suitable frame 10, in the front end of which are journaled two transverse feed-rollers 11 and 12, which are arranged one beneath the other, and which are preferably rubber covered in order that they may get a good grip on the fur 9 and feed it into the machine. The rollers are at one end geared together by means of gear-wheels 13, (see Fig. 3,) one of which gear-wheels meshes with a driving gear-wheel 14 on the driving-shaft 15, which is hung in the frame and a suitable bracket 16, (see Figs. 1 and 2,) and is provided with a driving-pulley 17, although it may be driven in any suitable way.

In order that the operation of the machine may be fully understood, we shall describe the several driving connections of the different rollers; but it will be understood that a y ordinary means may be employed for driving the rollers or brushes without affecting the principle of the invention.

The several rollers are separable to a certain extent, and therefore the upper bearings are movable and are preferably arranged as shown in Fig. 11, which represents a bearing of the feed-roller 12. This roller is journaled in a box 18, which has a hollow post 19 on top, containing a spring $19^a$, which projects upward into a hollow screw 20, which turns in a stationary block or plate 21, which is detachably secured to the machine-frame, and this screw has a hole 22 extending through it, so that an instrument may be inserted in the hole to enable the screw to be easily turned, and by adjusting the screw it will be seen that the tension of the spring $19^a$ may be regulated and the pressure of the rollers controlled. The front sides of the rollers 12 and 11 have opposite them aprons 23 and 24, between which the fur passes and which are adapted to press together against the fur, so as to straighten out the kinks and wrinkles therein, and the upper apron is stationary, while the lower one is movable, as shown best in Figs. 8 to 10, the apron 24 being to this end provided with slide-blocks 25, which are firmly fastened to opposite edges of the apron and slide in dovetailed grooves 26, made in thickened portions of the frame 10, (see Fig. 10,) and the apron has lugs 28 on it, beneath which press springs 27, which rest on lugs 29 below, the latter being secured to the frame 10, (see Figs. 8 and 9,) and the pressure of the springs holds the apron 24 up against the apron 23 or against a pelt which may be passing between the aprons. After leaving the feed-rollers the pelt passes between the bearing-rollers 30 and the acid-brush 31, which scrubs the acid into the fur and evenly distributes it through the same, and the rollers 30 are arranged side by side and are preferably rubber-covered, as shown in Fig. 6; but other things may be substituted for them, as hereinafter specified. Both the rollers 30 and brush 31 are journaled in vertically-movable blocks 32, which slide in opposite ends of the frame and are adjusted by means of screws 33, this arrangement being for the purpose of bringing the brush and rollers into proper alignment with the feed-rollers and the wringing-rollers, which are placed behind the brush, as presently described. The shaft of the brush is provided with a pulley 34, so that the brush may be independently and rapidly driven; but, if desired, it may be geared to the other moving parts of the machine. One of the rollers 30 is driven by gear-wheels 35 and 36, the latter being on one of the wringing-rollers 38 and the other roller 30 is geared to one of the gear-wheels 13.

The wringing-rollers 37 and 38 are similar to the rollers 11 and 12, are connected by gear-wheels 39, and are arranged behind the brush and rollers 30, and the pelt which has been saturated with acid passes between these rollers and is wrung out and the surplus acid squeezed from it.

The brush 31 picks up its acid from a trough 40, which is arranged beneath it, the sides of the trough being curved, as shown at 41 in Fig. 6, so as to overlap the sides of the rollers 11 and 37. The acid which is squeezed from the pelt by the rollers 37 and 38 drops into a pan 42, which is supported beneath the rollers 37 and 11, the pan having a curved rib 43 on one side and a terminal curve 44 at the opposite edge, so that it may rest securely on the cross-rods 45 of the machine-frame and yet be readily detachable. The pan has a discharge-pipe 46, (see Figs. 2 and 7,) which is adapted to connect by means of a hose 47 or other pipe with a tank 48, and the liquid caught in the pan 42 thus runs into the tank and may be reused. The acid is supplied to the brush by simply turning a sufficient quantity into the trough 40.

After passing between the wringing-rollers the pelt is run over a polishing-table 49 (see Fig. 6) and beneath a polishing-wheel 50, which has preferably a rubber surface and is corrugated longitudinally, so that by pressing or pushing the skin forward the fur is laid down and polished. The bearings of the polishing-roller 50 are movable vertically, as also are the bearings of the wringing-rollers 38, the several bearings being arranged like the bearings of the roller 12, previously described. The pelt is finished when it leaves the table 49, and it is discharged upon a delivering apron or belt 51, which runs over rollers 52 and 53, the latter being journaled in a supporting-frame 54 at the rear end of the main frame 10. The roller 52 is provided at one end with a gear-wheel 55, which is driven by an idler 56 on the main frame, and the latter meshes with the gear-wheel 39 of the roller 37, and on the opposite end of the roller 52 is a gear-wheel 57, (see Fig. 5,) which drives the gear-wheel 58 on one end of the polishing-roller 50.

It will be seen from the foregoing description that the pelts may be fed one after another into the machine, that they will pass rapidly between the rollers 11 and 12, over the brush 31, beneath the rollers 30, out through the wringing-rollers 37 and 38, and finally between the polishing-table 49 and roller 50 and be delivered, completely carroted, upon the belt 51, and that the surplus acid will be caught in the pan 42 and saved.

In some cases it is desirable to have a block 59 arranged beneath the brush, and in this case the block is arranged at the lower ends of the slides 32, as shown in Fig. 12, while the brush 31 is journaled above the block which serves as a bearing for the pelt as it passes beneath the brush, and when this arrangement is used the acid-trough is dispensed with and a feed-pipe 60 is arranged above the brush and adapted to deliver acid thereon, as shown clearly in the drawings. What is practically a reversal of the parts 49 and 50 may be used, in which case a corrugated roller 61 is used in the same position as the polishing-table 49, and a polishing-block 62 is arranged above the roller in vertically-yielding bearings, as shown clearly in Figs. 12 and 13.

In Fig. 13 we have shown a corrugated roller 63, which has at one end a gear-wheel 64 to drive it, and the corrugations of which are parallel and circumferential. This roller is used instead of the block 59 and as a bearing for a pelt, and the brush 31 is arranged above it, while the acid is delivered through a jet-pipe 65, having numerous jets 66, arranged to deliver either rearward, as shown in Fig. 13, if the pelt is to be fed through head first, or forward, as shown in Fig. 15, if the pelt is to be fed through tail first. The roller 63 serves also as a carrier to carry the pelt from the feed-rollers to the wringing-rollers, and the corrugations keep it dry. Another modification shown in Fig. 15 is to use a polishing-brush 31$^a$ instead of the corrugated roller 50. (Shown in Fig. 5.)

Where the jet-pipe 65 is used, as shown in Figs. 13 and 15, the acid is forced in under pressure, so as to be delivered in a spray upon the pelt, and to effect this the arrangement shown in Fig. 16 is used. The jet-pipe 65, which is shown in diagram in the figure referred to, is supplied by means of a pipe 67, which is controlled by a valve and connects with a cross-pipe 68, entering the tanks 69 and 70, so that the liquid may be forced out through the pipe 67 and into the jet-pipe from either tank. The two tanks are also connected by a pipe 71, controlled by a valve, so that the acid may be forced from one tank to the other when desired, and the tanks are also provided with suitable drawing-off pipes 72. The tanks are both connected by independent pipes 73 with the acid-pan 42, so that the acid may be returned to them after it has been used, and the tanks also connect by means of a pipe 74 with a source of compressed-air supply, the air being forced into the tank-tops and the pipe being controlled by valves 75 and 76. The acid is thus returning to one tank while it is being discharged from the other. If the acid is to be forced from the tank 69 into the jet-pipe and returned to the tank 70, the valve of the pipe 67 is opened, the pipe 73 connecting with the tank 42 is opened, the valve 76 closed, and the valve 75 opened. Thus the air-pressure will force the acid out through the pipes 68 and 67 and into the jet-pipe, and when the acid is to be returned to the tank 70 the pipe 73, connecting with the said tank, may be opened. If the acid is to be forced from the tank 70, the valve 75 is closed and the valve 76 opened, so that the air-pressure is applied to the tank 70.

We do not limit our invention to the precise arrangement shown for forcing the acid into the jet-pipe, as it may be forced there in any convenient way without affecting the principle of the invention.

Having thus described our invention, we claim as new and desire to secure by Letters Patent—

1. A carroting machine, comprising feed rollers, a rotary brush arranged behind the feed rollers, a pelt bearing opposite the brush, wringing rollers arranged behind the brush, and an acid pan beneath the brush and rollers, substantially as described.

2. A carroting machine, comprising feed rollers, a rotary brush arranged behind the feed rollers, a pelt bearing opposite the brush, wringing rollers behind the brush, and a polishing device arranged behind the wringing rollers, substantially as described.

3. A carroting machine, comprising feed rollers, a rotary brush arranged behind the feed rollers, a pelt bearing opposite the brush, wringing rollers arranged behind the brush and its bearing, a polishing device behind the wringing rollers, and a movable discharge belt behind the polishing device, substantially as described.

4. In a carroting machine, the combination, with the feed rollers and the acid applying mechanism behind the rollers, of the separable aprons arranged in front of the rollers, substantially as described.

5. In a carroting machine, the combination, with the feed rollers and the acid applying mechanism behind the rollers, of the aprons arranged edge to edge in front of the rollers, one apron being stationary and the other spring-pressed, substantially as described.

6. The combination, with the acid applying mechanism and the wringing rollers, of the polishing table arranged behind the rollers, and the polishing roller turning on the table, substantially as described.

7. The combination, with the acid applying mechanism and the wringing rollers, of the polishing table and the polishing roller turning on the table, the roller being longitudinally corrugated, substantially as described.

8. In a carroting machine, the combination, with the feed rollers, the revoluble brush and the pelt bearing for the brush, of a jet pipe arranged to deliver near the brush, an acid pan arranged beneath the brush, and a system of tanks and pipes whereby the acid may be delivered, under pressure, to the jet pipes and discharged from the acid pan, substantially as described.

9. In a carroting machine, the combination, with the acid applying mechanism, the acid pan and the jet pipe arranged to deliver to the acid applying mechanism, of the connected tanks having a common pipe leading to the jet pipe, valve-controlled pipes leading from the acid pan to the tanks, and an air supply pipe having valve controlled branches connected with the upper parts of the tanks, substantially as described.

10. A carroting machine, comprising a pair of separable aprons placed edge to edge, a pair of feed rollers behind the aprons, a revoluble brush and a movable bearing opposite it, the brush and its bearing being placed behind the feed rollers, a transverse jet pipe delivering in front of the brush, a pair of wringing rollers behind the brush, a polishing device behind the wringing rollers, and a discharge plate behind the polishing device, all substantially as described.

JOHN H. SANDERS.
     JAMES E. CARLIN.
     HUGH FITZPATRICK.

Witnesses to the signature of John H. Sanders:
 FREDERICK MATHESINS,
 RICHARD M. KIMBEL.

Witnesses to the signature of James E. Carlin:
 JOHN L. PAULDING,
 URIAH E. WOOD.

Witnesses to the signature of Hugh Fitzpatrick:
 W. J. SEARRY,
 MICHAEL MALARKEY.